(12) United States Patent
Chang

(10) Patent No.: US 11,267,399 B2
(45) Date of Patent: Mar. 8, 2022

(54) DISPLAY DEVICE PROVIDING TWO IMAGES AND VEHICLE FOR PROVIDING INFORMATION THROUGH THE SAME

(71) Applicant: AU OPTRONICS CORPORATION, Hsin-Chu (TW)

(72) Inventor: Chih-Chun Chang, Hsin-Chu (TW)

(73) Assignee: AU OPTRONICS CORPORATION, Hsin-Chu (TW)

(*) Notice: Subject to any disclaimer, the term of this patent is extended or adjusted under 35 U.S.C. 154(b) by 0 days.

(21) Appl. No.: 16/931,895

(22) Filed: Jul. 17, 2020

(65) Prior Publication Data
US 2021/0031682 A1 Feb. 4, 2021

(30) Foreign Application Priority Data

Aug. 2, 2019 (TW) .................................. 108127637
Jan. 20, 2020 (TW) .................................. 109101858

(51) Int. Cl.
*B60Q 3/12* (2017.01)
*B60Q 3/208* (2017.01)
(Continued)

(52) U.S. Cl.
CPC ................ *B60Q 3/12* (2017.02); *B60K 37/02* (2013.01); *B60Q 3/208* (2017.02);
(Continued)

(58) Field of Classification Search
CPC .......... B60Q 3/12; B60Q 3/208; B60K 37/02; B60K 2370/336; B60K 2370/334;
(Continued)

(56) References Cited

U.S. PATENT DOCUMENTS 10,234,683 B2 3/2019 Okayama et al.
10,451,871 B2 10/2019 Lee et al.
(Continued)

FOREIGN PATENT DOCUMENTS

CN 102466882 5/2012
CN 204102491 U 1/2015
(Continued)

OTHER PUBLICATIONS

Kondo et al. JP2016-206289, Dec. 2016 machine translation (Year: 2016).*

(Continued)

*Primary Examiner* — Tracie Y Green
(74) *Attorney, Agent, or Firm* — WPAT, PC

(57) ABSTRACT

A display device and a vehicle are provided. The display device includes a first display panel, a second display panel and a light-emitting module. The first display panel includes a first side and a first light-receiving surface. The second display panel includes a second side and a second light-receiving surface. The first side is connected to the second side such that the first display panel and the second display panel form an including angle, and the first light-receiving surface and the second light-receiving surface form a light-emitting space. The light-emitting module is disposed corresponding to the light-emitting space. The light-emitting module emits an illuminating light into the light-emitting space such that a part of the illuminating light forms a first image through the first display panel, and another part of the illuminating light passes through the second display panel and is projected onto a display surface where it forms a second image.

12 Claims, 4 Drawing Sheets

(51) Int. Cl.
  *G02B 27/01* (2006.01)
  *B60K 37/02* (2006.01)
(52) U.S. Cl.
  CPC .... *G02B 27/0101* (2013.01); *B60K 2370/334* (2019.05); *B60K 2370/336* (2019.05)
(58) Field of Classification Search
  CPC ...... B60K 2370/1529; B60K 2370/785; B60K 2370/66; B60K 35/00; G02B 27/0101; G02B 2027/0165
  See application file for complete search history.

(56) References Cited

U.S. PATENT DOCUMENTS

| | | | |
|---|---|---|---|
| 11,112,604 B2* | 9/2021 | Stamm | G02B 27/0101 |
| 2016/0147074 A1 | 5/2016 | Kobayashi et al. | |
| 2017/0059771 A1* | 3/2017 | Yuki | G02B 6/0088 |
| 2018/0267764 A1 | 9/2018 | Fan et al. | |
| 2021/0279846 A1* | 9/2021 | Aluru | H04N 5/2355 |

FOREIGN PATENT DOCUMENTS

| | | | |
|---|---|---|---|
| CN | 106483700 A | | 3/2017 |
| EP | 3133435 | | 2/2017 |
| JP | 2016-206289 | * | 12/2016 |
| JP | 2016-206289 A | | 12/2016 |
| TW | 201725420 | | 7/2017 |

OTHER PUBLICATIONS

Intellectual Property Office of Singapore (IPOS) has issued an Search Report and Written Opinion for the corresponding Singapore application dated Jun. 2, 2021.
India has issued an Examination Report for the corresponding India application dated Jun. 24, 2021.
China has issued an office action for the corresponding China application dated Sep. 16, 2021.

* cited by examiner

DISPLAY DEVICE PROVIDING TWO IMAGES AND VEHICLE FOR PROVIDING INFORMATION THROUGH THE SAME

BACKGROUND OF THE INVENTION

1. Field of the Invention

The present invention provides an optical device and a vehicle, particularly a display device and a vehicle.

2. Description of the Prior Art

As optical technology develops, display devices including liquid crystal panel and light-emitting diodes (LEDs) have been widely applied in various fields. Furthermore, these display devices are widely applied in vehicles such as cars and motorcycles, so as to support drivers.

Existing head up displays (HUDs) and dashboards utilize different backlight sources and consequently take up excessive space in vehicles. Thus, room for improvement still exists in the existing display devices applied in vehicles.

SUMMARY OF THE INVENTION

The present invention provides a display device that is able to display and project images.

The present invention provides a vehicle that can present to drivers high quality images through a display device.

A display device according to an embodiment of the present invention includes a first display panel, a second display panel, and a light-emitting module.

The present invention provides a display device and a vehicle. The display device includes a first display panel, a second display panel, and a light-emitting module. The first display panel includes a first side and a first light-receiving surface. The second display panel has a second side and a second light-receiving surface. The first side is connected to the second side such that the first display panel and the second display panel form an including angle, and the first light-receiving surface and the second light-receiving surface form a light-emitting space. The light-emitting module is disposed corresponding to the light-emitting space. The light-emitting module emits an illuminating light into the light-emitting space such that a part of the illuminating light forms a first image through the first display panel, and another part of the illuminating light passes through the second display panel and is projected onto a display surface to form a second image.

A vehicle according to an embodiment of the present invention includes a windshield, a dashboard, and the display device described above.

Summing up the above, the display device of the present invention may provide, through the first display panel and the second display panel, two images to a user; and the vehicle of the present invention may provide, through the display device described above, better information to the user.

DETAILED DESCRIPTION OF THE PREFERRED EMBODIMENT

Figure 1A:
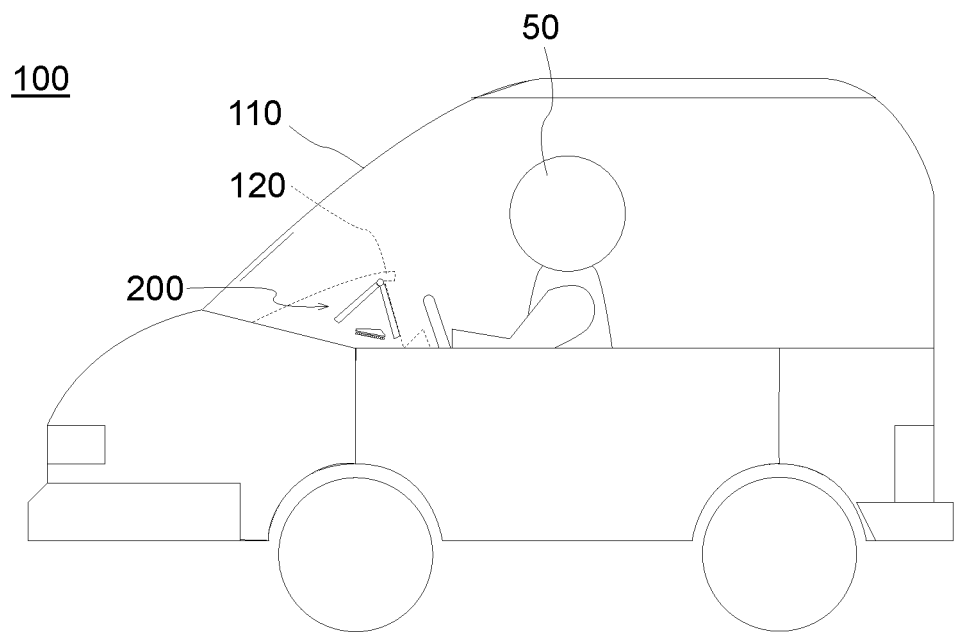
FIG. 1A illustrates a schematic view of a vehicle according to the first embodiment of the present invention.

The display device and vehicle according to the present invention will be described in detail below through embodiments and with reference to the accompanying drawings. A person having ordinary skill in the art may understand the advantages and effects of the present disclosure through the contents disclosed in the present specification. However, the contents shown in the following sentences never limit the scope of the present disclosure. Without departing from the conception principles of the present invention, a person having ordinary skill in the present art may realize the present disclosure through other embodiments based on different views and applications.

For the purposes of clarity, the illustrations in the figures are schematic, and are intended to present the basic structure of the present invention. Therefore, the structures shown in the figures are not drawn to the actual shape and scale. For example, sizes of certain elements may be enlarged for convenience of description. It should be understood that, when an element such as a layer, a film, a panel, a region or a substrate are described as "being on" or "being connected to" another element, they may be directly on or connected to another element, or there may be other elements therebetween. On the other hand, when an element is described as "directly existing on another element" or "being directly connected to" another element, there is no element therebetween. As used in the present specification, a "connection" may be a physical and/or electrical connection. In addition, an "electrical connection" or "coupling" means that other elements may exist therebetween.

If not defined specifically, all terms in the specifications (including terms about technology and science) have the same meaning as those understood by those who have ordinal skill in the art. It should be further understood that, for example, the terms defined in commonly used dictionaries should be interpreted as having a meaning that is consistent with their meaning in the context of the relevant art and the present disclosure, and should not be interpreted in an idealized or overly formal sense unless expressly so defined herein.

It should be understood that, even though the terms such as "first", "second", "third" may be used to describe an element, a part, a region, a layer and/or a portion in the present specification, but these elements, parts, regions, layers and/or portions are not limited by such terms. Such terms are merely used to differentiate an element, a part, a region, a layer and/or a portion from another element, part, region, layer and/or portion. Therefore, in the following discussions, a first element, portion, region, layer or portion may be called a second element, portion, region, layer or portion, and do not depart from the teaching of the present disclosure.

The display device of the present invention may be applied in electronic devices that demand the functions of projection and display at the same time. Preferably, the display device of the present invention may be applied in vehicles that demand head up display (HUD).

FIG. 1A illustrates a schematic view of a vehicle according to the first embodiment of the present invention. Please refer to FIG. 1A, in the first embodiment of the present invention, the vehicle 100 includes the windshield 110, the dashboard 120, and the display device 200. In this embodiment, the windshield 110 is, for example, disposed at the front of the vehicle 100 (i.e., in front of the driver 50 when the driver 50 is driving the vehicle 100). The dashboard 120 is also disposed in front of the driver 50 when the driver 50 is driving the vehicle 100, and is adjacent to the lower end of the windshield 110. The vehicle and the display device of the present invention will together be described below with reference to the figures.

Figure 1B:
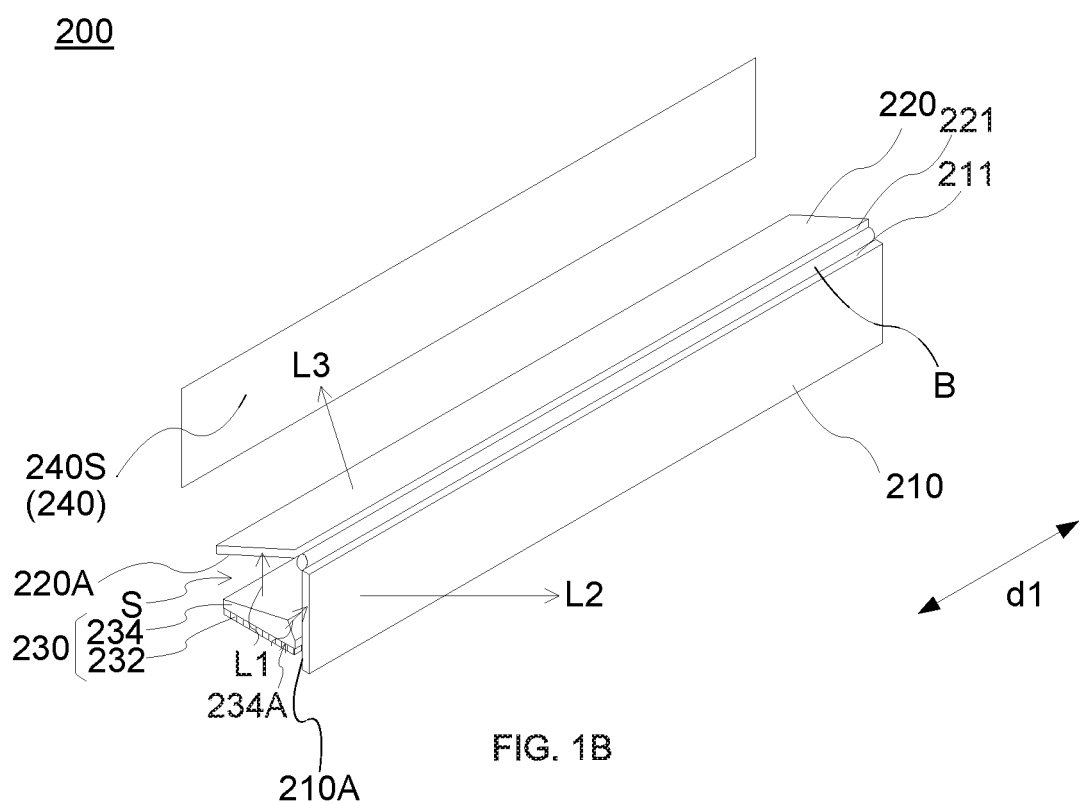
FIG. 1B illustrates a 3-dimensional schematic view of a display device according to the first embodiment of the present invention.

FIG. 1B illustrates a 3-dimensional schematic view of a display device according to the first embodiment of the present invention. Please refer to FIG. 1B. The display device 200 includes the first display panel 210, the second display panel 220, and the light-emitting module 230. The first display panel 210 has a first side 211 and a first light-receiving surface 210A; the second display panel 220 has a second side 221 and a second light-receiving surface 220A. The first side 211 is connected to the second side 221 such that the first display panel 210 and the second display panel 220 form an including angle, and the first light-receiving surface 210A and the second light-receiving surface 220A form a light-emitting space S. The light-emitting module 230 is disposed corresponding to the light-emitting space S, so that the light-emitting module 230 emits an illuminating light L1 into the light-emitting space S. A part of the illuminating light L1 forms a first image L2 through the first display panel 210, and another part of the illuminating light L1 passes through the second display panel 220 and is projected onto a display surface 240S to form a second image L3.

In this embodiment, the first image L2 is the image displayed on the light-emitting surface of the first display panel 210, and may be observed by the user of the vehicle 100 (i.e., the driver 50); the second image L3 may be projected on a display surface 240S in front of the windshield 110 to be observed by the user(i.e., the driver 50). The display surface 240S may be provided by, for example, a reflective film disposed on the windshield 110, but the present invention is not limited thereto.

With the features described above, the display device 200 of the present invention may provide two images to the driver 50 in the vehicle 100 simultaneously, so as to support the driver 50 and save space in the vehicle 100.

More specifically, in the first embodiment of the present invention, the first display panel 210 and the second display panel 220 may be, for example, liquid crystal display panels, so as to control transmissions of light and generate images, wherein the first display panel 210 may be disposed, for example, on the dashboard 120 of the vehicle 100. The display device 200 may further include a combiner 240 that provides the display surface 240S. The combiner 240 may be disposed between the windshield 110 and the second display panel 220 of the vehicle 100 described above. More specifically, the combiner 240 may be, for example, an optical film that reflects at least part of the lights outputted by the second display panel 220 and transmits the lights from the external environment, so the driver 50 may see the external environment and the second image L3 simultaneously. Accordingly, the display device 200 may provide images and project images simultaneously.

As shown in FIG. 1B, the light-emitting module 230 of this embodiment includes a plurality of light-emitting units 232 and a light guide plate 234. The light guide plate 234 has a first light-emitting surface 234D and a second light-emitting surface 234E. The first light-emitting surface 234D corresponds to the first light-receiving surface 210A, and the second light-emitting surface 234E corresponds to the second light-receiving surface 220A. The light-emitting units 232 are configured to emit the illuminating light L1. The illuminating light L1 is transmitted to at least either one of the first light-emitting surface 234D or the second light-emitting surface 234E through the light guide plate 234 after it is emitted from the light-emitting units 232.

The light guide plate 234, the first display panel 210, and the second display panel 220 of this embodiment substantially extend along a first direction d1. The first direction d1 may be, for example, perpendicular to the traveling direction of the vehicle 100.

More specifically, the light-emitting units 232 of the light-emitting module 230 of this embodiment is arranged in a direct type arrangement. The light guide plate 234 has a direct type incidence surface 234A that faces away from the first display panel 210 and the second display panel 220. The light-emitting units 232 are adjacent to the direct type incidence surface 234A and provide the illuminating light L1 to the light guide plate 234.

Figure 2A:
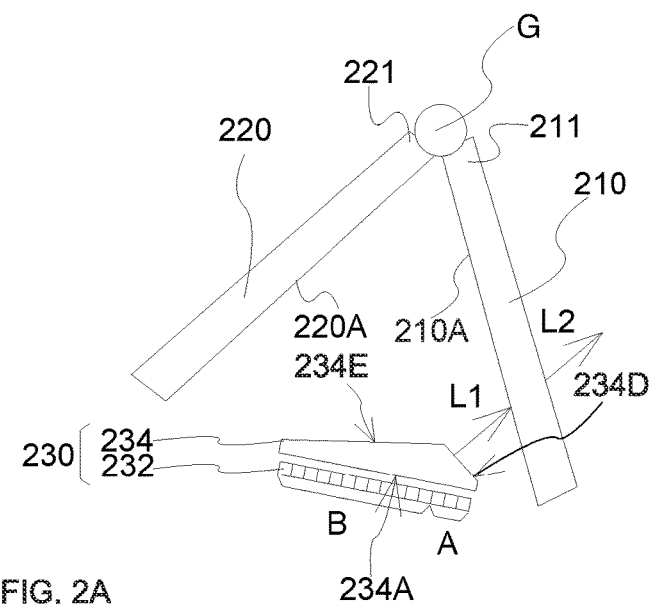
FIG. 2A and FIG. 2B illustrate schematic views of a display device of the first embodiment of the present invention.
Figure 2B:
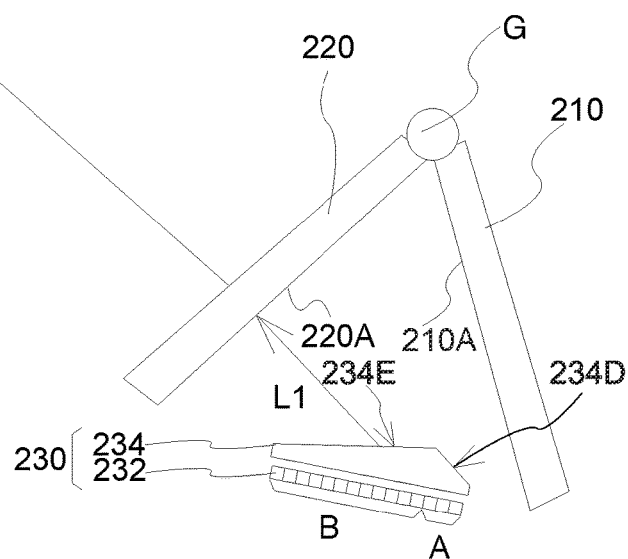

The light-emitting module 230 of this embodiment may further control the transmission of the illuminating light L1. FIG. 2A and FIG. 2B illustrate schematic views of the display device of the first embodiment of the present invention. Please refer to FIG. 2A. The light-emitting module 230 of this embodiment may, preferably, emit only the illuminating light L1 transmitted to the first display panel 210, so the display device 200 provides only the first image L2. Please refer to FIG. 2B. In another mode, the light-emitting module 230 of this embodiment may emit only the illuminating light L1 transmitted to the second display panel 220, so the display device 200 provides only the second image L3.

In this embodiment, the light-emitting module 230 controls the illuminating light L1 by lighting different portions of the light-emitting units 232 respectively. More specifically, a portion of the light-emitting units 232 is correspondingly disposed in a first region A of the direct type incidence surface 234A, and another portion of the light-emitting units 232 is correspondingly disposed in a second region B. A vertical projection of the first light-emitting surface 234D on the direct type incidence surface 234A is at least partly overlapped with the first region A, and a vertical projection of the second light-emitting surface 234E on the direct type incidence surface 234A is at least partly overlapped with the second region B. The light-emitting module 230 may light up the light-emitting units 232 corresponding to the first region A to emit the illuminating light L1 transmitted to the first display panel 210; the light-emitting module 230 may also light up the light-emitting units 232 corresponding to the second region B to emit the illuminating light L1 transmitted to the second display panel 220. The light-emitting module 230 may also light up all of the light-emitting units 232 to light up the first display panel 210 and the second display panel 220 simultaneously.

Preferably, the light-emitting units 232 are, for example, light-emitting diodes, and the intensity of the illuminating light L1 received by the first display panel 210 may be less than that of the illuminating light L1 received by the second display panel 220, wherein the distribution of the intensity of the illuminating light L1 may be adjusted by adjusting the size of the light-emitting surface or the distribution of the micro structure on the light-emitting surface of the light guide plate 234, but the present invention is not limited thereto. In a preferred embodiment, the ratio of the intensity of the illuminating light L1 received by the first display panel 210 to the intensity of the illuminating light L1 received by the second display panel 220 is between 0.5 and 19. In another embodiment, the ratio of the intensity of the illuminating light L1 received by the first display panel 210 to the intensity of the illuminating light L1 received by the second display panel 220 may be between 0.05 and 2. However the present invention is not limited thereto.

In one embodiment, the intensity of the illuminating light L1 received by the first display panel 210 is roughly 25000 nits; the transmittance of light of the first display panel 210 is roughly in the range of 2~10%; and the intensity of the first image L2 is roughly 1000 nits. The illuminating light L1 received by the second display panel 220 is roughly 500000 nits; the transmittance of light of the second display panel 220 is roughly in the range of 1~10%; and the intensity of the second image L3 is roughly 3000 nits. As can be calculated, in this embodiment, the ratio of the intensity of the illuminating light L1 received by the first display panel 210 to the intensity of the illuminating light L1 received by the second display panel 220 is 0.05 (25000 nits/500000 nits).

Figure 3A:
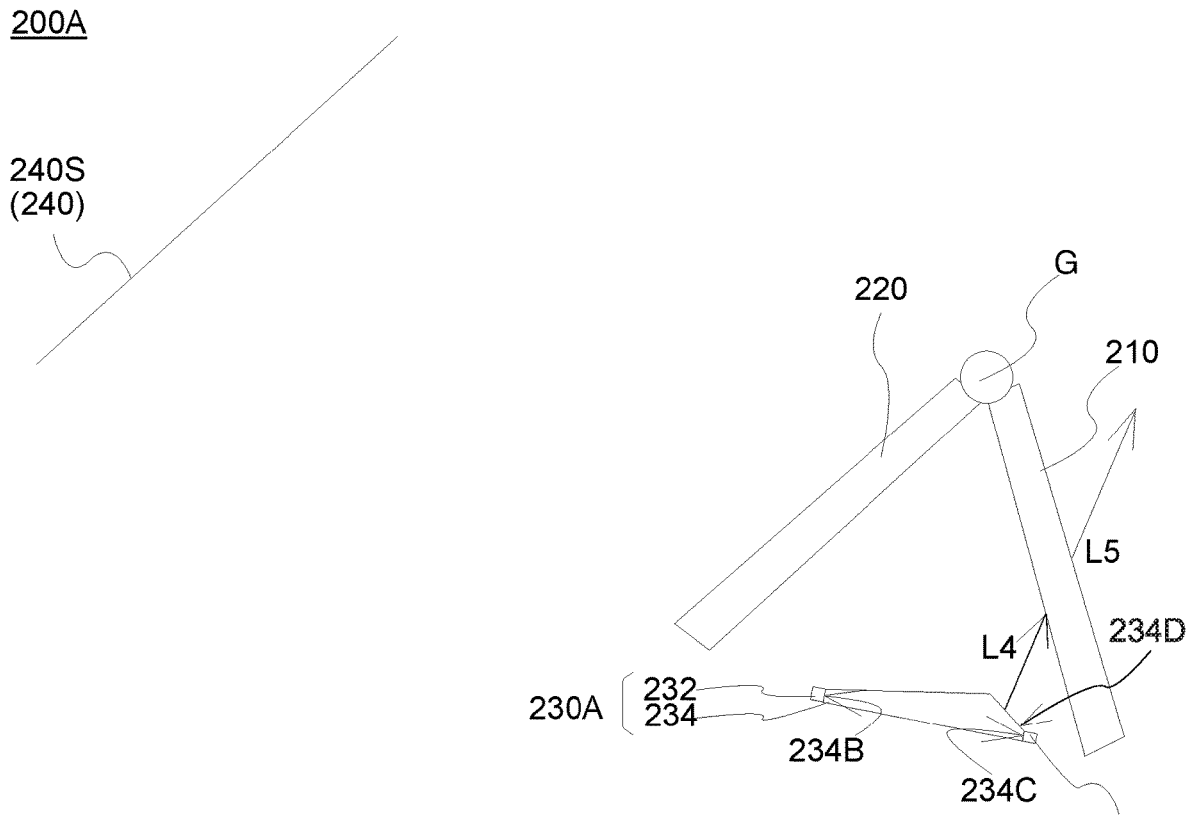
FIG. 3A and FIG. 3B illustrate schematic views of a display device of another embodiment of the present invention.
Figure 3B:
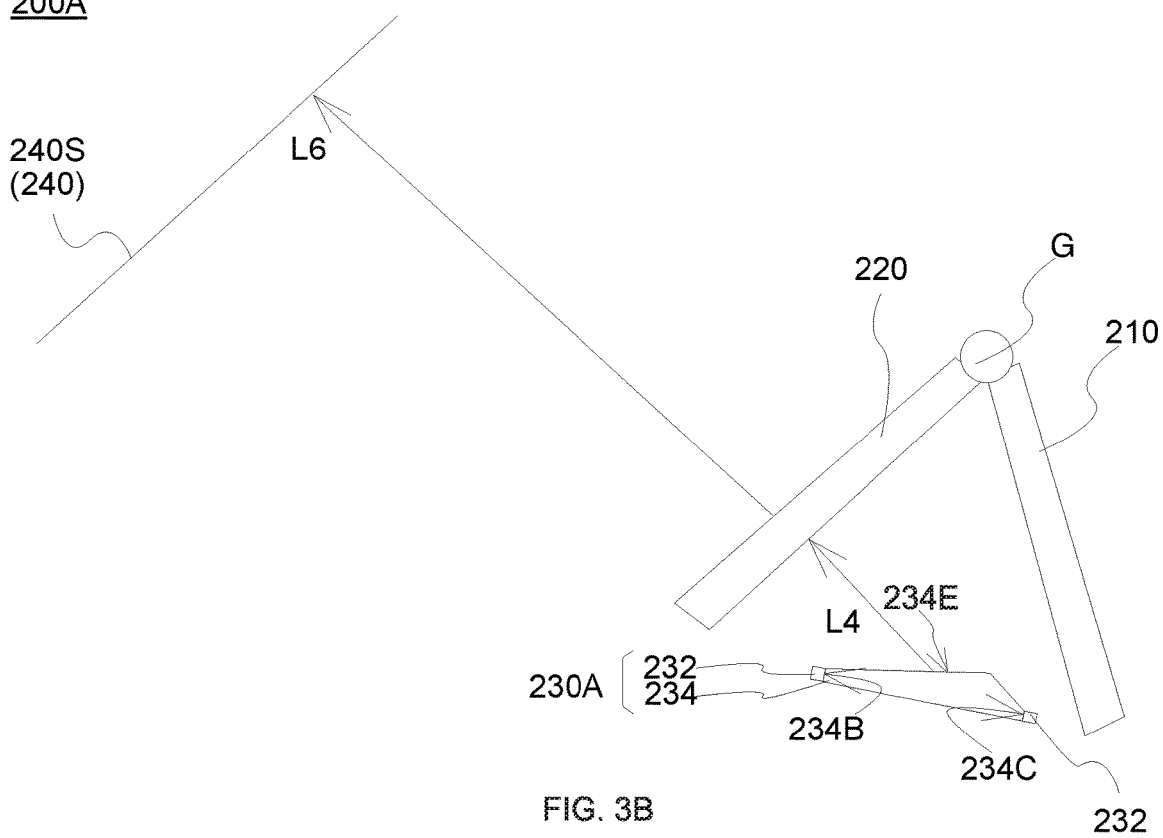

Nevertheless, the light-emitting module of the present invention is not limited by the distribution of the light-emitting units 232 described above. In some embodiments, the light-emitting units in the light-emitting module may be arranged in edge type arrangements in the light-emitting module 230. FIG. 3A and FIG. 3B illustrate schematic views of a display device of another embodiment of the present invention. Please refer to FIG. 3A. Similar to the display device 200 described above, the display device 200A of another embodiment of the present invention includes a first display panel 210, a second display panel 220, and the light-emitting module 230A that provides the illuminating light L4 to the first display panel 210 and the second display panel 220. Similar to the light-emitting module 230, the light-emitting module 230A of this embodiment includes a plurality of light-emitting units 232 and a light guide plate 234. The difference between the light-emitting module 230 and the light-emitting module 230A is that, in the light-emitting module 230A, a portion of the light-emitting units 232 is disposed on the first incidence surface 234B of the light guide plate 234, and another portion of the light-emitting units 232 is disposed on the second incidence surface 234C of the light guide plate 234.

In this embodiment, the first incidence surface 234B of the light guide plate 234 is on the side that is adjacent to the second display panel 220, and the second incidence surface 234C of the light guide plate 234 is on the side that is adjacent to the first display panel 210. Please refer to FIG. 3A. Accordingly, the illuminating light L4 emitted by the light-emitting units 232 on the first incidence surface 234B may be transmitted to the first light-emitting surface 234D through the light guide plate 234, and form the first image L5 through the first display panel 210. Please refer to FIG. 3B. Illuminating light L4 emitted by the light-emitting units 232 on the second incidence surface 234C may be transmitted to the second light-emitting surface 234E through the light guide plate 234, and be projected on the display surface 240S through the second display panel 220 to form the second image L6.

Figure 4A:
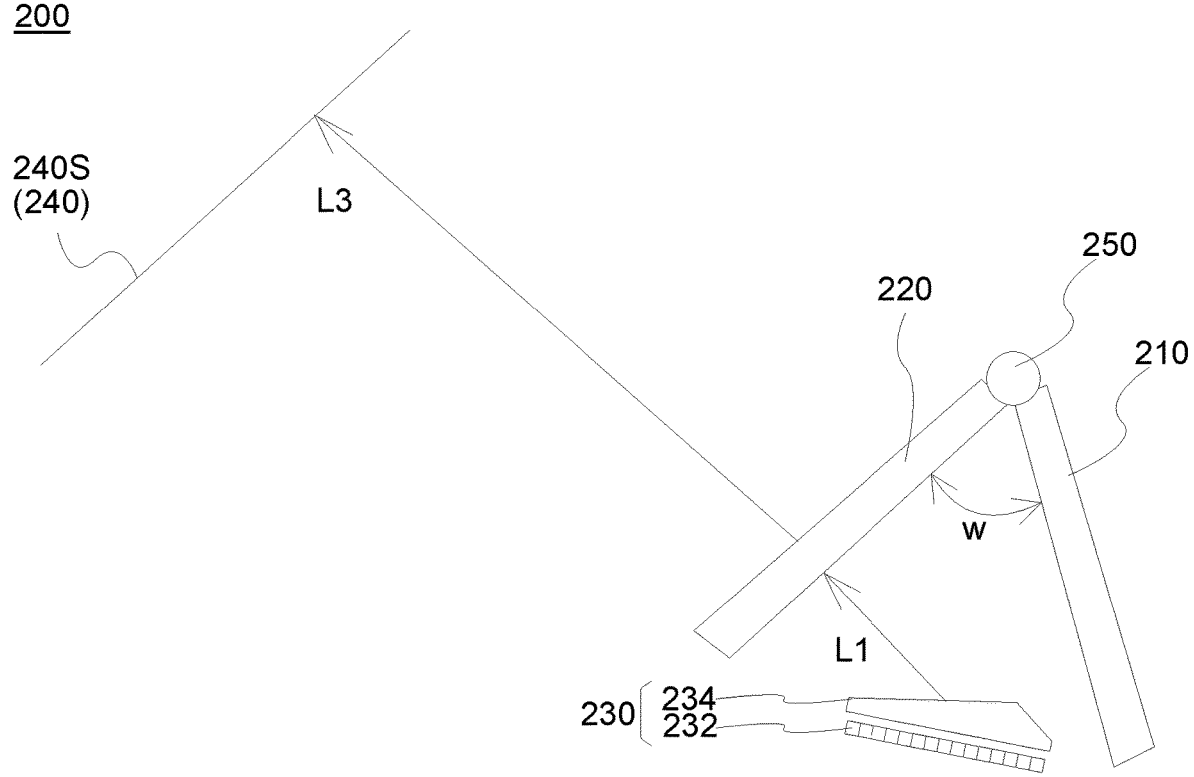
FIG. 4A and FIG. 4B illustrate schematic views of a display device of the first embodiment of the present invention.
Figure 4B:
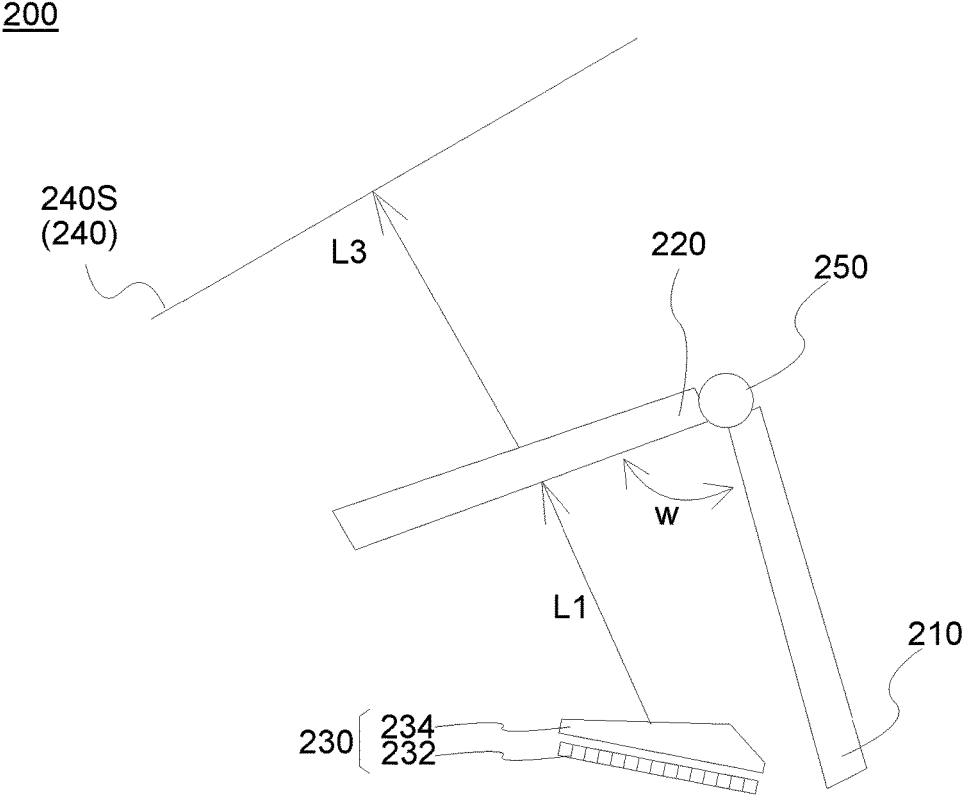

In the embodiments described above, the first side 211 is connected to the second side 221 by the connecting element G so that the first display panel 210 and the second display panel 220 are connected. The connecting element G fixates the first display panel 210 and the second display panel 220 and further saves the space taken up by the display device 200. However, the present invention is not limited thereto. Please refer to the schematic views of a display device of the first embodiment of the present invention illustrated by FIG. 4A and FIG. 4B. The display device 200 includes the hinging element 250. The hinging element 250 is connected to the first display panel 210 and the second display panel 220, and is adapted to adjust the including angle w between the first display panel 210 and the second display panel 220. Please refer to FIG. 4B. By adjusting the hinging element 250, the including angle w between the first display panel 210 and the second display panel 220 may be increased, and the projection location of the second image L3 may be adjusted, so that the user may set it to appropriate height. More specifically, the hinging element 250 of this embodiment may be adapted, for example, to set the including angle w between the first display panel 210 and the second display panel 220 in the range between 5° and 90°. In this embodiment, by adjusting the including angle w with the hinging element 250, the size of the second image L3 projected on the display surface 240S may be further adjusted.

Summing up the above, the display device of the present invention may display and project images by the first display panel and the second display panel, so as to save the space taken up by the display device while providing two kinds of images. The vehicle of the present invention may display an image to the driver with the first display panel and project a second image with the second display panel, providing excellent support to the driver.

The above disclosure is just the preferred embodiments of the present invention and is not intended to limit the claims of the present invention. Any equivalent technical variation of the description and drawings of the present invention of the present shall be within the scope of the claims of the present invention.

LIST OF REFERENCE NUMERALS

A: first region
B: second region
L1, L4: illuminating light
L2, L5: first image
L3, L6: second image
S: light-emitting space
w: including angle
G: connecting element
50: driver
100: vehicle
110: windshield
120: dashboard
200, 200A: display device
210: first display panel
211: first side
210A: first light-receiving surface
220: second display panel
221: second side
220A: second light-receiving surface
230, 230A: light-emitting module
232: light-emitting unit
234: light guide plate
234A: direct type incidence surface
234B: first light-emitting surface
234C: second light-receiving surface
234D: first light-emitting surface 234E: second light-emitting surface
240: combiner
240S: display surface
250: hinging element

What is claimed is:

1. A display device, comprising:
a first display panel having a first side and a first light-receiving surface;
a second display panel having a second side and a second light-receiving surface, wherein the first side is connected to the second side such that the first display panel and the second display panel form an including angle, and the first light-receiving surface and the second light-receiving surface form a light-emitting space; and
a light-emitting module disposed corresponding to the light-emitting space, wherein the light-emitting module emits an illuminating light into the light-emitting space such that a part of the illuminating light forms a first image through the first display panel, and another part of the illuminating light passes through the second display panel in case of the illuminating light not being reflected and is projected onto a display surface to form a second image.

2. The display device of claim 1, wherein the light-emitting module comprises:
at least one light-emitting unit; and
a light guide plate having a first light-emitting surface and a second light-emitting surface, the first light-emitting surface corresponds to the first light-receiving surface, the second light-emitting surface corresponds to the second light-receiving surface, wherein the light-emitting unit provides the illuminating light to the light guide plate, the illuminating light is transmitted to at least one of the first light-emitting surface and the second light-emitting surface through the light guide plate.

3. The display device of claim 2, wherein the light guide plate comprises a direct type incidence surface, the direct type incidence surface faces away from the first light-receiving surface and the second light-receiving surface, the light-emitting unit provides the illuminating light to the light guide plate through the direct type incidence surface.

4. The display device of claim 3, wherein the light-emitting module comprises a plurality of light-emitting units, a portion of the plurality of light emitting-units is correspondingly disposed in a first region of the direct type incidence surface, another portion of the plurality of light-emitting units is correspondingly disposed in a second region of the direct type incidence surface, wherein a vertical projection of the first light-emitting surface on the direct type incidence surface is at least partly overlapped with the first region, and a vertical projection of the second light-emitting surface on the direct type incidence surface is at least partly overlapped with the second region.

5. The display device of claim 2, wherein the light guide plate comprises a first incidence surface and a second incidence surface, the first incidence surface is adjacent to the second display panel, the second incidence surface is adjacent to the first display panel; wherein the light-emitting module comprises a plurality of light-emitting units, a portion of the light-emitting units is adjacent to the first incidence surface and is configured to provide the illuminating light to the first light-emitting surface through the light guide plate, another portion of the light-emitting units is adjacent to the second incidence surface and is configured to provide the illuminating light to the second display panel through the light guide plate.

6. The display device of claim 1, further comprising:
a hinging element connected to the first display panel and the second display panel, the hinging element is configured to adjust the including angle between the first display panel and the second display panel.

7. The display device of claim 1, wherein a ratio of an intensity of the illuminating light received by the first display panel to an intensity of the illuminating light received by the second display panel is greater than 0.05 and less than 19.

8. The display device of claim 7, wherein a ratio of an intensity of the illuminating light received by the first display panel to an intensity of the illuminating light received by the second display panel is greater than 0.5 and less than 19.

9. The display device of claim 7, wherein a ratio of an intensity of the illuminating light received by the first display panel to an intensity of the illuminating light received by the second display panel is greater than 0.05 and less than 2.

10. A vehicle, comprising:
a windshield;
a dashboard; and
the display device of claim 1, wherein the first display panel is disposed on the dashboard, and the display surface is on the windshield.

11. The vehicle of claim 10, further comprising a combiner disposed between the windshield and the display device, wherein the combiner is configured to provide the display surface, and the combiner comprises a semi-transparent-semi-reflective material.

12. The vehicle of claim 10, wherein the light-emitting module comprises:
at least one light-emitting unit; and
a light guide plate having a first light-emitting surface and a second light-emitting surface, the first light-emitting surface corresponds to the first light-receiving surface, the second light-emitting surface corresponds to the second light-receiving surface, wherein the light-emitting unit provides the illuminating light to the light guide plate, the illuminating light is transmitted to at least one of the first light-emitting surface and the second light-emitting surface through the light guide plate, and
wherein the light guide plate, the first side, and the second side substantially extend along a first direction, and the first direction is perpendicular to a traveling direction of the vehicle.

* * * * *